United States Patent Office 3,342,768
Patented Sept. 19, 1967

3,342,768
COATING COMPOSITIONS COMPRISING A POLYAMIC ACID COMPOSITION AND A 2,4-DIAMINO-6-SUBSTITUTED-s-TRIAZINE
John R. Chalmers, Wallingford, Pa., assignor to E. I. du Pont de Nemours and Company, Wilmington, Del., a corporation of Delaware
No Drawing. Filed Oct. 8, 1962, Ser. No. 229,172
12 Claims. (Cl. 260—32.6)

This invention relates to curable polymer compositions comprising a polyamic acid composition and soluble 2,4-diamino-6-substituted-s-triazines as a modifier therefor and to a method for preparing polyamic acid compositions which are curable at a significantly lower temperature than is ordinarily required to convert the polyamic acid composition to a polyimide composition.

Certain classes of polyamic acids have outstanding physical and chemical properties which make them extremely useful for shaping into useful structures by coating on various substrates, casting as films, extruding through dies, or by similar processing. Such polyamic acid structures can be converted by heating or by chemical means to polyimide structures which are characterized by properties even more desirable than those of the polyamic acids, e.g. high tensile properties, desirable electrical properties and and stability toward heat and water.

Conversion of polyamic acid compositions to polyimide compositions by heat alone can occur over a wide range in temperature. In the preparation of polyamic acid compositions, a process temperature not exceeding about 50° C. is required to provide the polymer as substantially 100% of the polyamic acid. However, prior to conversion to polyimide, the polymeric composition may usefully have a content of polyamic acid as low as 50%, i.e., the remainder may be up to 50% of the polyimide. A processing temperature up to about 60° C. for the polyamic acid composition will ordinarily provide the polymeric composition with at least this 50% minimum content of polyamic acid. For conversion of the polyamic acid composition to polyimide by heating, a temperature significantly above 60° C. is usually required. The heat-converted polymeric composition is provided with optimum properties if conversion includes heating further at an elevated temperature, e.g., in the range of 300° C. to 500° C., for a short interval usually ranging from about 15 seconds to about 15 minutes, a particularly suitable range being about 1 to 5 minutes at 400° C. In comparison, heating at 200° C. for at least about 16 hours is required to provide an equivalent heat-converted composition. Although these high temperature conversion conditions provide desirable improvements in the polymeric product, they limit utilization of the heat-converted material to fields of application where these high temperatures can be tolerated. More extensive utilization can be achieved if comparable properties can be provided by heating at moderate baking temperatures ordinarily used in the curing of baking type coating compositions, e.g. curing for 10 to 150 minutes at 120° C. to 200° C., i .e. about 250° F. to 400° F.

The primary objective of this invention is to provide modified polyamic acid compositions which develop advantageous and desirable properties characteristic of polyimide compositions when the modified polyamic acid composition is cured by heating under moderate temperature and time conditions used comerically in the curing of ordinary baking enamels, and to a method of preparing such modified polyamic acid compositions.

These and other related objectives are accomplished by blending with a polyamic acid composition (A) an effective modifying proportion of (B) a soluble 2,4-diamino-6-substituted-s-triazine having a solubilizing substituent in the 6 position, e.g. benzoguanamine, the s-triazine and the polyamic acid composition each being in solution in an organic liquid mutual solvent therefor.

The term s-triazine as used throughout the specification and the claims refers to the soluble 2,4-diamino-6-substituted-1,3,5-triazines, the solubilizing substituent in the 6 position being adequate to characterize the s-triazine with sufficient solubility in the mutual solvent to provide at least 5 parts of the s-triazine in solution per 100 parts of the polyamic acid composition (A) in solution.

Ordinarily, at least 5 parts of the modifying 2,4-diamino-6-substituted-1,3,5-triazine per 100 parts of the polyamic acid composition are required to provide a significant contribution. Useful proportions of the soluble s-triazine can be as high as 45 parts on the indicated basis. The preferred proportions range from about 10 parts to about 35 parts, 15 to 30 parts being especially preferred. Proportions greater than 35 parts generally introduce significant brittleness into the cured polymeric composition which ordinarily is undesirable. Within the indicated range of proportions of the 2,4-diamino-6-substituted-s-triazine, solubility thereof in the mutual solvent should not be exceeded. The polyamic acid composition (A) in solution so modified with the s-triazine (B) dissolved in the mutual solvent therefor is applied to a substrate, dried by loss of volatile solvent from the applied solution composition and cured by heating at a temperature preferably in the range of 120° C. to 200° C. However, higher temperatures ordinarily used in heat conversion of the unmodified polyamic acid composition to polyimide can be used to cure the s-triazine modified polyamic acid composition. The s-triazine modified polymer compositions of this invention cured under the indicated moderate heating conditions exhibit resistance to solvents and good electrical properties, e.g., a low dissipation factor and a low dielectric constant, characteristics which are not achieved by curing the unmodified polyamic acid composition under the same moderate heating conditions. A further advantage is improved hydrolytic stability in comparison with the corresponding polyamic acid composition not modified with the s-triazine.

By the term "polyamic acid composition" as used throughout the specification is meant polymer compositions having a plurality of recurring units having the following general formula:

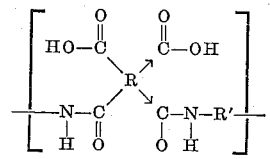

wherein

is an organic tetravalent radical containing at least two carbon atoms, no more than two carbonyl groups of each polyamide acid unit being joined to any one carbon atom of the tetravalent radical

—R'— is a divalent radical originating from at least one organic diamine having the structural formula: $H_2N$—R'—$NH_2$ wherein —R'— is a divalent organic radical containing at least two carbon atoms, the two amino groups thereof each being attached to separate carbon atoms of the indicated divalent radical. The tetravalent radical

originates from at least one tetracarboxylic acid dianhydride having the structural formula:

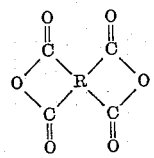

wherein

is an organic tetravalent radical as hereinbefore defined. The arrows → denotes isomerism. The number of recurring polyamic acid units in the polymer structure is sufficient to provide an inherent viscosity of at least 0.1, preferably 0.3 to 5, as measured as an 0.5% solution in N,N-dimethylacetamide usually at 30° C., sometimes at 25° C.

The process for preparing the polyamic acid compositions comprises reacting by mixing at least one of the organic diamines having the structure $H_2N-R'-NH_2$ with at least one tetracarboxylic acid dianhydride of the identified structure in an organic solvent for at least one of the reactants, the solvent being inert to the reactants and preferably anhydrous. The reaction is carried out by heating the reactants at a temperature below 175° C. For the development of maximum inherent viscosity and optimum properties, it is usually necessary to operate at a reaction temperature below 60° C. preferably no greater than about 50° C. The reaction temperature and reaction period will vary with the particular combinations of reactants used and the particular solvent used. The reaction is exothermic and consequently the reaction temperature is so selected as to be adequately controllable to result in a polymer composition whereof at least 50% by weight of the structural units have the indicated polyamic acid structure, i.e., less than 50% of the units have been converted to polyimide structure. Although the reaction period may be as short as one minute, the reaction conditions are generally so selected as to provide a polymer composition of the desired characteristics which requires a reaction period usually in the range from about 30 to about 500 minutes.

The reactants usually are in equimolar proportions but can range up to 5% excess of either reactant. More than this excess of either reactant results in undesirably low molecular weight polyamic acid or other disadvantages. It is usually desirable for the excess of either reactant not to exceed about 3%. Besides use of such an excess of either reactant to control the molecular weight of the polymer, a chain-terminating agent may be used to "cap" the ends of the polymer chains, e.g., phthalic anhydride can be used for this purpose.

In the preparation of the polyamic acid composition, the proportion of organic solvent need only be sufficient to dissolve enough of one reactant, preferably to dissolve the diamine, to initiate the reaction of the diamine and the dianhydride. For forming the polyamic acid compositions into shaped articles, most successful results are obtained when the solvent component usually constitutes at least 60% of the final polymer solution, i.e., the solution may contain from 0.5 to 40% of the polyamic acid component. If desired, the polyamic acid can be isolated in a stable form by precipitation from the polymer solution with a non-solvent for the polyamic acids, e.g., cyclohexanone, dioxane, benzene, etc. Solutions of the polyamic acid composition (A) at 3% to 30% concentration are particularly suitable for coating purposes. These polyamic acid solutions modified with the 2,4-diamino-6-substituted-s-triazine, e.g., benzoguanamine, in accordance with this invention may have an organic film-forming content of up to about 58% by weight whereof the polyamic acid content is up to 40%. When the polyamic acid content is preferably no greater than 30%, the total content of organic film-forming material is ordinarily no greater than about 40% by weight.

Useful organic diamine reactants for preparing the polyamic acids are characerized by the general formula $H_2-N-R'-NH_2$ wherein $-R'-$ is as heretofore defined and may be selected from the following general groups: aromatic, aliphatic, heterocyclic, bridged organic radicals wherein the bridging moiety is oxygen, nitrogen, sulfur, silicon, or phosphorus, and substituted groups thereof. Preferred diamines contain at least six carbon atoms preferably including a structure characterized by benzenoid unsaturation. These preferred diamines having benzenoid unsaturation may be further characterized by $-R'-$ being identified by one of the following structures:

and

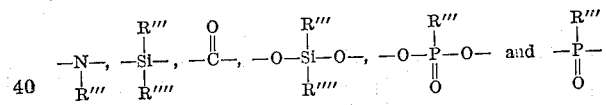

wherein the moiety $-R''-$ can be an alkylene chain of 1 to 3 carbon atoms, $-O-$, $-S-$, $-SO_2-$, $$-N-,\ -Si-,\ -C-,\ -O-Si-O-,\ -O-P-O-\ \text{and}\ -P-$$

wherein $-R'''-$ and $-R''''-$ are selected from the group consisting of alkyl and aryl. The following species of diamines are typical of suitable diamine reactants for practicing the invention:

4,4'-diaminodiphenyl
4,4'-diamino-diphenyl ether
4,4'-diamino-diphenyl methane
4,4'-diamino-diphenyl propane
Meta-phenylene diamine
Para-phenylene diamine
4,4'-diamino-diphenyl sulfone
4,4'-diaminobenzophenone
Benzidine
4,4'-diamino-diphenyl sulfide
3,3'-diamino-diphenyl sulfone
Bis-(4-amino-phenyl) phosphine oxide
Bis-(4-amino-phenyl) diethyl silane
m-Xylylene diamine
p-Xylylene diamine
Hexamethylene diamine
Heptamethylene diamine
Octamethylene diamine
Nonamethylene diamine
Decamethylene diamine
Dodecamethylene diamine
2,11-diamino-dodecane
3-methylheptamethylene diamine
4,4-dimethylheptamethylene diamine
2,2-dimethyl propylene diamine
2,5-dimethylhexamethylene diamine
2,5-dimethylheptamethylene diamine
5-methylnonamethylene diamine
1,12-diamino-octadecane
1,4-diamino-cyclohexane 2,6-diaminopyridine
1,5-diaminonaphthalene
3,3'-dimethyl-4,4'-diamino-biphenyl
2,4-bis-(beta-amino-t-butyl)toluene
Bis-(para-beta-amino-t-butyl-phenyl)ether
4,4'-methylene-bis-(2-chloroaniline)
Para-bis-(2-methyl-4-amino-pentyl)benzene
Para-bis-(1,1-dimethyl-5-amino-pentyl)benzene
Bis-(para-amino-cyclohexyl)methane
1,2-bis-(3-amino-propoxy)ethane
3-methoxy-hexamethylene diamine
Bis-(4-amino-phenyl)-N-methylamine
3,3'-dimethoxy benzidine
H₂N(CH₂)₃O(CH₂)₂O(CH₂)₃NH₂
H₂N(CH₂)₃S(CH₂)₃NH₂
H₂N(CH₂)₃N(CH₃)(CH₂)₃NH₂

Mixtures of these species of the diamines can be used to provide copolyamic acid compositions.

Useful tetracarboxylic acid dianhydride reactants are characterized by the general formula:

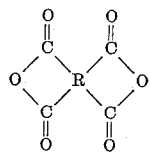

wherein the tetravalent radical

is as heretofore defined and may be selected from the following general groups: aromatic, aliphatic, cycloaliphatic, heterocyclic, combinations of aromatic and aliphatic, and substituted groups thereof. Preferred tetracarboxylic acid dianhydrides contain at least six carbon atoms in the

radical, preferably including a structure characterized by benzenoid unsaturation. The four carbonyl groups of the dianhydride are each joined to separate carbon atoms and each pair of carbonyl moieties of the anhydride is joined directly to adjacent carbon atoms in the

radical to provide a 5-membered anhydride ring identified as follows:

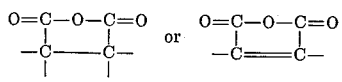

The following species are typical of tetracarboxylic acid dianhydrides suitable for practicing the invention:

Pyromellitic dianhydride
3,3',4,4'-benzophenone tetracarboxylic dianhydride
2,2',3,3'-benzophenone tetracarboxylic dianhydride
3,3',4,4'-diphenyl tetracarboxylic dianhydride
2,2',3,3'-diphenyl tetracarboxylic dianhydride
2,2-bis-(3,4-dicarboxyphenyl)propane dianhydride
2,2-bis-(2,3-dicarboxyphenyl)propane dianhydride
Bis-(3,4-dicarboxyphenyl)ether dianhydride
Bis-(3,4-dicarboxyphenyl)sulfone dianhydride
1,1-bis-(2,3-dicarboxyphenyl)ethane dianhydride
1,1-bis-(3,4-dicarboxyphenyl)ethane dianhydride
Bis-(2,3-dicarboxyphenyl)methane dianhydride
Bis-(3,4-dicarboxyphenyl)methane dianhydride
2,3,6,7-naphthalene tetracarboxylic dianhydride
1,2,4,5-naphthalene tetracarboxylic dianhydride
1,2,5,6-naphthalene tetracarboxylic dianhydride
Benzene-1,2,3,4-tetracarboxylic dianhydride
Perylene-3,4,9,10-tetracarboxylic dianhydride
Pyrazine-2,3,5,6-tetracarboxylic dianhydride
Thiophene-2,3,4,5-tetracarboxylic dianhydride and dianhydrides having the general structure:

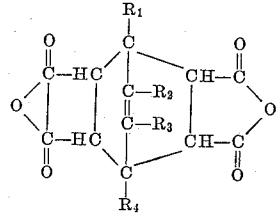

where $R_1-$, $R_2-$, $R_3-$ and $R_4-$ are each members selected from hydrogen, alkyl, aryl, and aralkyl.

It will be recognized that the polyamic acid compositions may be more complex than the reaction product of the diamine reactants and the tetracarboxylic acid reactants. For example, amine-terminated linear polyamides or carboxyl-terminated linear polyamides of difunctional reactants can be present with the principal diamine and tetracarboxylic reactants or reaction products to provide copolymeric condensation products having both the polyamide units and the recurring of the polyamic acid.

Solvents which are useful in synthesizing the polyamic acid compositions by solution polymerization are substantially inert organic liquids, other than either of the polymer-forming reactants or homologs thereof, which constitute a solvent for at least one of the reactants, and contains functional groups, the functional groups being groups other than monofunctional primary and secondary amino groups and other than monofunctional dicarboxyanhydro groups. Preferably the solvent is characterized by solvency for both of the reactants and, preferably, also by solvency for the polyamic acid reaction product. A particularly useful class of solvents are the normally liquid N,N-dialkylcarboxylamides of which the lower molecular weight species are preferred, e.g., N,N-dimethylformamide and N,N-dimethylacetamide. These solvents can be easily removed from the polyamic acid composition, coatings thereof and shaped articles thereof by evaporation, displacement or diffusion. Other useful solvents of this class are: N,N-diethylformamide, N,N-diethylacetamide, and N,N-dimethoxyacetamide. Other typical useful solvents which may be used alone or in combination with these N,N-dialkylcarboxylamides include: N-methyl caprolactam, N-methyl-2-pyrrolidone, N-acetyl-2-pyrrolidone, dimethylsulfoxide, tetramethylene urea, pyridine, dimethylsulfone, tetramethylene sulfone, formamide, N-methyl formamide, and hexamethylphosphoramide. These more active solvents can be used in combination with poor solvents such as dioxane, butyrolactone, benzonitrile, benzene, toluene, xylene, and cyclohexane.

The procedure for reacting the diamine and tetracarboxylic acid dianhydride to produce the polyamic acid composition can be carried out by any of several methods. One technique is to premix equimolar proportions of the two reactants as dry solids and then add the uniform dry mixture, in small proportions and with agitation, to the organic solvent, controlling the temperature and rate of the process to a reaction temperature below a predetermined value which minimizes conversion of the polyamic acid to polyimide, preferably below 50° C. Alternatively, the solvent can be added to the mixture of the reactants. Another method is to dissolve the diamine in the solvent, while agitating and preheating the solution to an elevated temperature, and then to add the dianhydride at a rate adequate to control the ultimate maximum reaction temperature. Still another method is to add the respective reactants in small portions to the solvent individually and alternatively, i.e., first diamine, then dianhydride, then diamine, etc. A further process comprises dissolving the diamine in a portion of the solvent and the dianhydride in a second portion of the same or another solvent and then mixing the respective solutions of reactants. Combinations of these methods can also be used to advantage. For example, the polyamic acid composition can be prepared by a first stage solution polymerization in which the dianhydride either in dry solid form or in solution is added incrementally to a solution of the diamine, followed by a second stage in which a mixture of the dry solid reactants are slowly added to the solution of the polyamic acid resulting from the first stage reaction.

The reaction is controlled to provide a polyamic acid having an inherent viscosity of at least 0.1, preferably in the range of 0.3 to 5, based on a solution of 0.5% by weight of the polyamic acid in N,N-dimethylacetamide usually at 30° C. Other active solvents can be used in lieu of the N,N-dimethylacetamide. The viscosity of the dilute solution of the polyamic acid is measured relative to viscosity of the solvent alone and the inherent viscosity is calculated on the basis of:

$$\text{Inherent viscosity} = \frac{\text{natural logarithm} \frac{\text{Viscosity of solution}}{\text{Viscosity of solvent}}}{C}$$

where C is the concentration of the polyamic acid in solution expressed as grams of polymer per 100 milliliters of solution.

Preparation of polyamic acid compositions are more fully described and claimed in copending application, Edwards, Ser. No. 95,014, filed Mar. 13, 1961. Polyimide compositions resulting from conversion of polyamic acid compositions are described and claimed in copending application, Edwards, Ser. No. 803,347, filed Apr. 1, 1959, and a continuation-in-part thereof, Ser. No. 169,120, filed Jan. 26, 1962. Methods for converting polyamic acids to polyimides are described and claimed in copending applications, Endrey, Ser. No. 803,349, filed Apr. 1, 1959, and in a continuation-in-part thereof, Ser. No. 169,119, filed Jan. 26, 1962, and copending Endrey, Ser. No. 169,106, filed Jan. 26, 1962.

Substituted s-triazines useful for modifying the described polyamic acid compositions curable at moderate baking temperatures are 2,4-diamino-6-substituted-1,3,5-triazines soluble in the solution of the polyamic acid composition (A). The monovalent radical in the 6-position of the 2,4-diamino-s-triazine is a solubilizing radical which provides the s-triazine with adequate solubility in the mutual solvent and miscibility with the polyamic acid composition (A). Preferably, the radical further has the effect of providing the s-triazine with a plasticizing contribution to the combination of the polyamic acid composition and the s-triazine. This radical in the 6-position may be alkyl, aryl, aralkyl, alkaryl, acyclic, cyclic, saturated or unsaturated, substituted or unsubstituted. The radical usually contains a plurality of carbon atoms in providing the necessary solubility. The radical may consist solely of carbon atoms and hydrogen atoms or it may have modifying substituents linked to one or more carbon atoms of the radical of the 6-position, such substituents being ordinarily non-reactive with the polyamic acid composition. Such substituents, when present, preferably have either a nitrogen atom in the structure thereof, e.g., nitro, cyano and anilino nitrogen atoms or an ether oxygen atom. Typical useful s-triazines characterized by adequate solubility and miscibility are:

2,4-diamino-6-phenyl-1,3,5-triazine, i.e., benzoguanamine
2,4-diamino-6-cyanopropyl-1,3,5-triazine
2,4-diamino-6-cyanoethyl-1,3,5-triazine
2,4-diamino-6-nitrophenyl-1,3,5-triazine
2,4-diamino6-tolyl-1,3,5-triazine
2,4-diamino-6-anisoyl-1,3,5-triazine
2,4-diamino-6-(N-anilino)-1,3,5-triazine
2,4-diamino-6-naphthyl-1,3,5-triazine
2,4-diamino-6-biphenyl-1,3,5-triazine Of these above-identified species of s-triazine, benzoguanamine is particularly useful. On the other hand, melamine, i.e., 2,4,6-triamino-1,3,5-triazine, which is poorly soluble and is trifunctional in reactive amine groups, is an unsatisfactory modifier for the polyamic acid composition. Diamino-s-triazines having still other radicals in the 6-position which provide the s-triazine with an adequate solubility of at least 5 parts, preferably 10 to 35 parts, per 100 parts by weight of the polyamic acid composition (A) in solution in a mutual solvent can be used.

For coating and impregnating purposes, the solution of polyamic acid and the 2,4-diamino-6-substituted-1,3,5-triazine, e.g., benzoguanamine, is adjusted in the relative proportions of volatile solvent and proportions of the aforementioned film-forming components to provide the solution with application characteristics conforming with the requirements of the particular technique of application, e.g., by spraying, dipping, roller coating, flow-coating, doctor blade coating and other ordinary coating and impregnating techniques.

The solution of polyamic acid and the modifying s-triazine therefor may be pigmented with pigments non-reactive with both the polyamic acid and the 2,4-diamino-6-substituted-s-triazine, e.g., titanium dioxide, carbon black, calcium carbonate, blanc fixe, asbestine, mica, silica, etc. The pigments are in usual proportions ranging from about 5 to about 200 parts, ordinarily no greater than 100 parts, per 100 parts of the organic film-forming components.

The invention compositions can be applied to a variety of substrates, for example, to metals, e.g. copper, brass, aluminum, steel, etc., in the form of sheet metal, fibers, wires, screening; glass in the form of sheets, fibers, foams, fabrics, etc.; polymeric materials, e.g. cellulosic materials, such as cellophane, paper, wood; polyolefins, e.g. polyethylene, polypropylene, polystyrene; polyamides, polyvinylacetals, polyesters, e.g. polyethylene terephthalate; polyurethanes; perfluorocarbon polymers, e.g. polytetrafluoroethylene, tetrafluoroethylene/hexafluoropropylene copolymers, such as polymeric materials being in the form of sheets, fibers, foams, woven and non-woven fabrics, screening, coatings, leather sheets, etc. The invention solutions are particularly useful for depositing a coating of curable polyamic acid composition on wire and converting the deposited coating to a cured composition having advantageous electrical insulating properties. Combination coatings may have either a primer, intermediate or topcoat layer provided by the invention composition, the remaining layers being provided by one or more of the aforementioned film-forming materials. The compositions of this invention are particularly advantageous for application to thermally stable, solid, organic substrates which are tolerant of the moderate heat-curing conditions for effecting the cure of the s-triazine modified polyamic acid composition but are subject to significant degradation when processed at high temperatures ordinarily required to effect conversion of the polyamic acid composition to polyamide in the absence of the s-triazine modifier. The compositions are also useful as adhesives. The moderate curing conditions open new areas of utility for the polyamic acid compositions which heretofore required heat-conversion to polyamides by prolonged heating at temperatures as low as 200° C. or up to 500° C. for more practical periods ranging up to 15 minutes. In contrast, adequate curing of the heat-curable compositions of this invention can be effected by heating at 120° C. to 200° C. for a period ranging from about 10 minutes to 150 minutes. After curing under these moderate conditions, the resulting cured coating of this invention on an adequately heat-resistant substrate can be heat-treated further under the aforementioned higher temperature conditions ordinarily used to convert the polyamic acid composition to polyimide.

The invention will be more clearly understood by reference to the examples which follow. These examples, which illustrate specific embodiments of the invention, should not be construed to limit the invention in any way. The proportions and percentages are expressed on a weight basis unless otherwise indicated.

PREPARATION OF POLYAMIC ACID SOLUTION I

First portion: Pounds
- N,N-dimethylacetamide _____ 739.5
- N-methyl-2-pyrrolidone _____ 1479.0
- 4,4'-diaminodiphenyl ether _____ 209.7

Second portion: Pyromellitic dianhydride _____ 221.7
Third portion: Pyromellitic dianhydride _____ 2.1

_____
2652.0

Pyromellitic dianhydride is the dianhydride of 1,2,4,5-benzenetetracarboxylic acid.

The ingredients of the first portion are charged into a 300-gallon stainless steel reaction vessel equipped with means for temperature control, and controllable agitation means for rapidly and thoroughly mixing the composition. The first portion charge is mixed with moderate agitation, about 75 r.p.m., with the temperature of the charge being adjusted to the 20° to 25° C. range. Mixing is continued until the diamine reactant is completely in solution. The second portion, i.e., the pyromellitic dianhydride, is added to the preformed solution at a rate of about 2.5 pounds per minute with rapid agitation of about 150 r.p.m. Charging of the second portion is complete in about 90 minutes. The reaction mixture is thoroughly mixed during the charging of the pyromellitic dianhydride and thereafter until the power input to the mixing means becomes constant. Heat is extracted from the exothermic reaction mixture to maintain the temperature below 40° C., usually in the 20° C. to 35° C. range. A preliminary viscosity determination is made of the composition and the pyromellitic dianhydride of the third portion is added with rapid agitation to the reaction mixture if the preliminary viscosity is Z-1 or less on the Gardner-Holdt scale at 25° C. This third portion is omitted if the preliminary viscosity is within the contemplated viscosity range for the composition. About one-half of the pyromellitic dianhydride of the third portion is added if the viscosity is about Z-2. The resulting polyamic acid solution is usually characterized by a viscosity of 40 to 80 poises at 25° C. as measured with a Brookfield viscosimeter using a #3 spindle at 12 r.p.m. The polymer content of the resulting polyamic acid solution I is about 16.5% by weight. Typical lots of polyamic acid solution I prepared according to this recipe result in polyamic acid characterized by an inherent viscosity usually in the range of 0.8 to 1.2 at 25° C.

PREPARATION OF POLYAMIC ACID SOLUTION II

First portion: Parts by wt.
- 4,4'-oxydianiline _____ 32.0
- N,N-dimethylacetamide _____ 143.0
- N-methyl-2-pyrrolidone _____ 286.0

Second portion: Benzophenonetetracarboxylic acid dianhydride _____ 52.1
Third portion: Benzophenonetetracarboxylic acid dianhydride _____ 0.5
Fourth portion: Benzophenonetetracarboxylic acid dianhydride _____ 0.45

_____
514.05

The first portion is charged into a 1 liter reaction vessel under a nitrogen atmosphere and mixed to form a complete solution of the diamine. The temperature of the charge is adjusted to 25° C. The second portion is added over a 15-minute period, the temperature of the reaction mixture being maintained between 25° C. and 30° C. The reaction is continued for about 80 minutes and the composition is sampled for viscosity. At this stage the preliminary viscosity is about T on the Gardner-Holdt scale at 25° C. The third portion is added and the reaction is continued for 40 minutes. At the end of this stage the preliminary viscosity is about Z-1. The fourth portion is added and the reaction continued for about 40 minutes at 25° to 30° C. At the end of this stage the preliminary viscosity is about Z-2 and the solution is cooled. The total addition of the dianhydride is about 0.99 mole per mole of the diamine. The inherent viscosity of the polymer of the resulting polyamic acid solution II is about 0.82.

PREPARATION OF POLYAMIC ACID SOLUTION III

First portion: Parts by wt.
- N,N-dimethylacetamide _____ 407.0
- N-methyl-2-pyrrolidone _____ 814.0
- Meta-phenylenediamine _____ 81.0

Second portion: Pyromellitic dianhydride _____ 160.2
Third portion: Pyromellitic dianhydride _____ 1.65
Fourth portion: Pyromellitic dianhydride _____ 1.65
Fifth portion: Pyromellitic dianhydride _____ 1.65

_____
1467.15

The first portion is charged into a 1500 ml. reaction flask under a nitrogen atmosphere and mixed to dissolve the diamine. The second portion is slowly added over a 30-minute period, the temperature of the reaction mixture being maintained in the 25° to 30° C. range by use of an ice bath while the mixture is rapidly stirred. The reaction is continued for 50 minutes and then the third portion is added. After a further reaction period of 25 minutes, the fourth portion is added and the reaction continued for 25 minutes. The fifth portion is added and the reaction is continued for an additional 25 minutes. The polymer of the resulting polyamic acid solution III is characterized by an inherent viscosity of 0.88 (25° C.).

*Example 1*

Modified polyamic acid coating compositions are prepared by blending per 100 grams of the liquid polyamic acid solution I, having a content of 16.5% of polyamic acid, the following respective proportions of benzoguanamine, i.e., 2,4-diamino-6-phenyl-1,3,5-triazine.

| | Weight of Benzoguanamine, Grams | Relative Proportion of Benzoguanamine, Parts |
|---|---|---|
| Composition 1a | 0.165 | 1 |
| Composition 1b | 0.825 | 5 |
| Composition 1c | 1.65 | 10 |
| Composition 1d | 3.3 | 20 |
| Composition 1e | 4.95 | 30 |
| Composition 1f | 6.6 | 40 |
| Composition 1g | 8.25 | 50 |
| Composition 1h | 16.5 | 100 |

The relative proportions are recited in parts per 100 parts by weight of the polyamic acid. The resulting compositions 1a through 1f exhibit complete solution of the benzoguanamine in the mutual solvent at ordinary room temperature, i.e., the benzoguanamine is soluble to the extent of at least 40 parts per 100 parts of the polyamic acid. The resulting compositions 1g and 1h are saturated solutions containing undissolved benzoguanamine.

The compositions 1a through 1f are cast on aluminum panels using a doctor blade set at 10 mils liquid coating thickness. Polyamic acid solution I is used as a comparative coating. The respective coated aluminum panels are baked for 15 minutes at 150° C., followed by 1 minute at 400° C. The resulting cured coatings are clear coatings comparable in appearance with the unmodified comparative coating I. The cured coating compositions are each evaluated for relative curing by subjecting the surface of the cured coating to exposure to a drop of solvent mixture of the same composition as that constituting the mutual solvent of the polyamic acid solution I. The cured unmodified comparative coating I and the cured modified coating 1a are readily dissolved in the mutual solvent. The cured coatings 1b and 1c exhibit crazing which is indicative of increasing resistance toward the mutual solvent. The cured coatings 1d, 1e and 1f exhibit insolubility in the mutual solvent which is an adequate solvent for the uncured polyamic acid compositions. Cured coating 1f is significantly brittle in comparison with 1c, 1d and 1e.

Compositions 1a through 1e are coated on glass panels at the 10 mil wet thickness, allowed to air-dry for 15 minutes, then baked for 10 minutes at about 150° C. and cooled to room temperature. The resulting cured coatings are evaluated for solvent resistance by exposing the surface to a drop of the mutual solvent mixture under a glass cover for 5 minutes. The cured comparative unmodied composition I and the cured composition 1a dissolve in the solvent mixture. Cured compositions 1b and 1c exhibit crazing, indicative of increasing solvent resistance. Cured compositions 1d and 1e are unattacked by the solvent mixture. These results parallel those obtained with the compositions applied and cured on the aluminum substrate although the supplemental baking at 400° C. is omitted. Modification of the polyamic acid composition with benzoguanamine enhances the cure at moderate baking temperatures, particularly when used in the proportions of 10 to 30 parts per 100 parts of the polyamic acid composition.

In another series of tests, composition 1d is coated on glass at 10 mils wet thickness and cured by heating for 10 minutes at 150° C. Comparative panels are prepared by coating the unmodified comparative solution I on glass at the same wet thickness. One of the comparative panels is cured by heating for 10 minutes at 150° C. and a second panel is cured by heating under the same conditions followed by heating for 1 minute at 400° C. The cured coatings are evaluated for elongation and tensile strength as determined with the Instron tester and hardness. The test results are recorded in the following tabulation:

|  | Composition 1d | Comparative Composition I | |
|---|---|---|---|
|  |  | Low Bake | High Bake |
| Cured Coating Thickness (mils) | 1.25 | 1.30 | 0.91 |
| Knoop Hardness | 19.1 | 15.4 | 15.5 |
| Elongation, percent | 16.6 | 20.0 | 11.8 |
| Tensile Strength, p.s.i. | 6,930 | 5,380 | 8,785 |

When the curing of composition 1d is extended to 30 minutes at 150° C., the elongation is 9.7% and the tensile strength is 12,070 p.s.i., the coating thickness being 0.98 mil.

In another series of tests, compositions 1c, 1d and 1e are coated on glass panels at 1 mil wet thickness and cured by heating for 20 minutes at 150° C. Additional glass panels are similarly coated with composition 1d and cured respectively by heating for 10 minutes at 150° C. followed by 1 minute at 400° C., and for 30 minutes at 150° C. The respective cured coatings are stripped from the glass and are subjected to infrared examination in comparison with the cured unmodified polyamic acid composition I. All of the coatings cured at 150° C. exhibit the

bands characteristic of the polyamic acid composition with an indication of the normal small amount of imide bands. Only the 1d and comparative coatings both cured with the supplemental heating at 400° C. exhibit the significant conversion to polyimide. Thus the functioning of the benzoguanamine is other than as a curing agent for conversion of the polyamic acid composition to polyimide.

In still another series of evaluations, compositions 1c, 1d and 1e are coated on glass panels at a wet thickness of 10 mils and cured at 150° C. for periods of 10 minutes, 20 minutes and 30 minutes respectively. The cured coatings are stripped from the glass panels, stored in a desiccator and weighed. The comparative unmodified composition I is cured for 10 minutes at 150° C. followed by 1 minute at 400° C. Specimens of the respective cured coatings are heat-aged for progressively lengthening cycles of 1 hour, 2 hours, 3 hours, 4 hours, 8 hours and 16 hours, for a total of 31 hours. The heat-aged samples after cooling in the desiccator subsequent to each cycle are reweighed for calculation of the weight loss. The benzoguanamine-modified polyamic acid compositions exhibit initial weight losses approximately equivalent to the benzoguanamine content. After the initial weight loss, i.e., loss of benzoguanamine, the rate of continued weight loss with the modified compositions is equivalent to the weight loss exhibited by the unmodified polyamic acid composition I. Maximum loss of the benzoguanamine is ordinarily achieved in the initial 1-hour cycle at the oven temperatures of 260° C., 300° C. and 400° C. In the coatings heat-aged at 300° C. and 400° C., the unconverted polyamic acid composition, ordinarily present in predominant proportion in the coatings cured at 150° C., is converted to polyimide during the initial 1 hour heat-aging cycle at the higher temperatures. The infrared spectra of these latter two heat-aged compositions are essentially identical with that of the comparative unmodified composition.

In a further series of evaluations, compositions 1c, 1d and 1f are coated on glass panels at 10 mils wet thickness and cured at the respective conditions of 60 minutes at 135° C., 10 and 20 minutes at 150° C. and 10 and 20 minutes at 177° C., the unmodified comparative polyamic acid composition I being also cured under these conditions. The resulting cured coatings are stripped from the glass panels and immersed in boiling water, measuring the time required for the cured coating to break into pieces. Of the coatings cured 60 minutes at 135° C., the comparative composition I exhibits hydrolytic stability of 0.25 hour in comparison with 2 to 2.5 hours for the modified compositions. When cured at 150° C. for 10 minutes, the hydrolytic stability of the comparative composition I is 2.5 minutes versus 50 to 100 minutes for the benzoguanamine-modified compositions. When cured for 20 minutes at 150° C., the unmodified comparative composition exhibits hydrolytic stability of 60 minutes versus 115 minutes to 150 minutes for the benzoguanamine-modified compositions. With the 177° C. curing temperature, the benzoguanamine-modified compositions exhibit hydrolytic stability of 2 to 4 hours when cured for 10 minutes, and 4 to 8 hours when cured for 20 minutes versus hydrolytic stability of 1 hour for the unmodified polyamic acid composition I. Of these three modifying proportions of benzoguanamine, 20 parts per 100 parts of the polyamic acid compositions provide the more advantageous results under the various curing conditions.

In the evaluation of dielectric breakdown properties of the benzoguanamine-modified polyamic acid compositions, compositions 1c, 1d, 1e and 1f are applied to copper panels which are prepared by sanding with 400A emery paper and rinsed with acetone, the coating being applied at a dry thickness in the range of 1.0 to 1.5 mils. A first series of these coatings on copper is cured by heating for 30 minutes at 150° C. A second series of these panels is cured by heating for 30 minutes at 150° C., followed by 3 minutes at 400° C. Comparative coated copper panels are prepared similarly, using the unmodified polyamic acid composition I which is cured by heating for 10 minutes at 150° C., followed by 3 minutes at 400° C. The results of the electrical breakdown are tabulated as follows:

|  | Coating Thickness, Mils | Volts/Mil |
|---|---|---|
| Comparative Coating I | 0.94 | 3,350 |
| 1c, Series 1 | 1.27 | 3,970 |
| 1d, Series 1 | 1.34 | 3,560 |
| 1e, Series 1 | 1.4 | 3,600 |
| 1f, Series 1 | 1.39 | 3,550 |
| 1c, Series 2 | 1.1 | 3,040 |
| 1d, Series 2 | 1.02 | 3,680 |
| 1e, Series 2 | 1.06 | 3,400 |
| 1f, Series 2 | 1.0 | 3,000 |

These benzoguanamine-modified polyamic acid coating compositions are satisfactorily coated on #18 gauge copper wire, using a commercial type wire-coater. The following are typical results obtained by the application of composition 1d, i.e., the composition modified with 20 parts of benzoguanamine per 100 parts of the polyamic acid. The copper wire is annealed at about 410° C. and dip-coated by recycling through the coating bath of composition 1d and coating die, and through a 18-foot curing oven at a speed of 25 feet per minute. The oven temperature ranges from a minimum of 60° C. up to controlled peak temperatures of 288° C., 316° C., 346° C. and 371° C. respectively. The coating bath is at about room temperature, e.g. 25° C. to 28° C. Coating is continued until the radial increase in build of the coated wire is in the range of 1.0 to 1.5 mils. The unmodified polyamic acid solution I is likewise coated on copper wire at 25 feet per minute at a curing temperature peaking at 377° C. to a radial increase in build of about 1.4 mils. In a second comparative run, the wire is coated at 18 feet per minute at a curing temperature peaking at 400° C. to a radial increase in build of 1.3 mils. The appearance and smoothness of the modified and unmodified insulating coatings are comparable. Likewise, the performance is comparable in reference to abrasion resistance, quick snap and dielectric twist tests which are conducted by standard procedures recognized in the electrical industry. In this latter test, the benzoguanamine-modified composition under the respective curing conditions exhibits an average breakdown voltage ranging from 8850 to 9360 volts. The unmodified comparative composition I under its respective curing conditions exhibits an average breakdown voltage ranging from 8980 to 10,290 volts. The dielectric constant for the cured 1d composition ranges from 3.68 for the lowest indicated peak curing temperature to 3.09 for the highest peak curing temperature. The dissipation factor respectively ranges from 0.89% for the low peak curing temperature to 0.24 for the high peak curing temperature. The dielectric constant for the unmodified comparative composition I ranges from 3.67 to 3.44 using the two respective curing temperatures and the dissipation factor ranges from 0.31% to 0.16%.

In the wire coating evaluation, the dissipation factors and dielectric constants are based on the respective coatings which are cured at a high temperature in the range of 288° C. to 400° C. These electrical characteristics are similarly determined for the compositions applied to copper panels and cured by heating for 30 minutes at 150° C. Under these conditions, these characteristics are as indicated in the following tabulation:

|  | Dissipation Factor, Percent | Dielectric Constant | Coating Thickness, mil |
|---|---|---|---|
| Unmodified Composition I | 3.61 | 7.13 | 0.6 |
| Composition 1c | 3.0 | 7.54 | 0.65 |
| Composition 1d | 1.05 | 4.62 | 0.7 |
| Composition 1e | 0.79 | 4.48 | 1.4 |

The benzoguanamine-modified composition 1d and the unmodified comparative composition are each used to impregnate glass fabric and cured under equivalent conditions. The electrical properties of the resulting impregnated glass fabrics are comparable for the benzoguanamine-modified and the unmodified compositions. The glass fabric impregnated with the 1d composition and cured by heating for 30 minutes at 150° C. exhibits better strength and less discoloration than the glass fabric impregnated with the unmodified comparative composition I cured at the usual temperatures in the range of 300° C. to 500° C.

Insulated copper wire having an extruded insulating layer of polytetrafluoroethylene thereon is coated with the composition 1d to provide an exterior coating having a radial build of about 0.4 mil for one and 0.8 mil for two coats. The unmodified comparative composition I is similarly applied over the polytetrafluoroethylene insulating layer. The respective topcoats are cured by heating for one minute at 200° C. The wire having the cured composition 1d as a topcoat layer exhibits a significant improvement in cut-through resistance over the wire having the cured topcoat of unmodified polyamic acid composition I which in turn exhibits significant improvement over the insulated wire having the polytetrafluoroethylene as the exposed surface layer.

Comparable results are achieved when the composition 1d is similarly applied as a cured topcoat over insulated wire having an insulating layer of perfluorocarbon resin which is a copolymer of tetrafluoroethylene and hexafluoropropylene.

These benzoguanamine-modified polyamic acid compositions coated on wood provide the surface with fire-retardancy properties. In a typical evaluation, a fir plywood panel is initially heated for 15 minutes at 163° C. and then immersed with the surface to be coated faced down in a coating bath of composition 1d for 10 minutes. The wetted surface is prilled with a #70 roll to remove the excess coating and then the treated wood is cured by heating for 10 minutes at 163° C. The coating process is repeated two more times with a 10-minute immersion each time, prilling and curing at 163° C., the second cure being for 10 minutes and the third, i.e. final, cure being for 15 minutes. Aside from the impregnation, the treatment provides about 1 mil of surface coating. The coated panel is mounted at a 45° angle one inch away from a two-inch Bunsen burner flame. During 2½ minutes of exposure to the heat, the cured coating exhibits slight char, but the char does not spread and the coating does not catch on fire or propagate the flame. In contrast, the untreated surface of the wood catches on fire and continues to burn. The cured composition 1d exhibits a detectable advantage over the unmodified polyamic acid composition in reference to fire-retardancy when cured on wood under the same conditions.

*Example 2*

A coating composition is prepared by blending benzoguanamine with the polyamic acid solution II in the proportion of 20 parts per 100 parts by weight of the polyamic acid content.

This composition is coated on a glass panel at a wet thickness of 10 mils and cured by heating for 20 minutes at 150° C. The unmodified composition II, as a comparative composition, is coated on glass and cured in the same manner. The benzoguanamine-modified coating in the cured state exhibits solvent resistance to the solvent mixture of the Example 2 composition in contrast with complete solubility of the cured comparative coating II in the same solvents. These two coating compositions are applied to copper panels and cured for 20 minutes at 150° C. Using a capacitor technique, the following electrical characteristics are obtained.

|  | Dissipation Factor, Percent | Dielectric Constant | Coating Thickness, mil |
|---|---|---|---|
| Example 2 Composition | 1.41 | 5.47 | 1.2 |
| Comparative Composition II | 3.47 | 4.34 | 0.9 |

The Example 2 composition is satisfactorily applied to wire to provide an insulating coating which when cured under the ordinary high temperature curing conditions described heretofore provides a coating equivalent to that of the unmodified comparative compositions I and II and also equivalent to that of composition 1d. Cured under moderate baking conditions, e.g. 10 to 30 minutes at 150° C., Example 2 provides a cured coating likewise equivalent to composition 1d cured under these same conditions.

*Example 3*

A coating composition is prepared, blending benzoguanamine with the polyamic acid solution III in the proportion of 20 parts per 100 parts by weight of the polyamic acid content.

This composition is coated on a glass panel and cured as described in Example 2. The resulting cured coating is solvent resistant in contrast with the similarly cured unmodified comparative composition III which exhibits solubility in the solvent mixture of the composition from which the coating was originally deposited.

The Example 3 composition, like the Example 1d and 2 compositions, exhibits desirable electrical properties which characterize it as useful as a wire enamel. It also exhibits advantageous properties when cured at moderate baking temperatures.

*Example 4*

Coating compositions are prepared by blending beta-cyanopropioguanamine with the polyamic acid solution I in the respective proportions of 10, 15 and 20 parts per 100 parts by weight of the polyamic acid content.

These compositions are coated on glass panels at a wet thickness of 10 mils and cured under the respective conditions of 10 and 20 minutes at 150° C. The cured coatings exhibit solvent resistance toward the solvent mixture of the parent solution composition II. However, at the indicated minimum cure and the minimum proportion of 10 parts of the cyanopropioguanamine modifier, etching of the cured coating is detectable. In contrast, the cured unmodified composition I is soluble in the solvent mixture.

This substituted guanamine, like benzoguanamine, is effective in providing polyamic acid coatings curable at moderate baking temperatures which exhibit advantageous properties.

Compositions prepared by substituting 2,4-diamino-6-beta-cyanoethyl-1,3,5-triazine for the 2,4-diamino-6-beta-cyanopropyl-1,3,5-triazine provide equivalent results.

*Example 5*

A coating composition is prepared by blending nitrobenzoguanamine with the polyamic acid solution I in the proportion of 10 parts per 100 parts by weight of the polyamic acid content. The modifier is not significantly soluble in the mutual solvent at room temperature and solubility is effected by heating the blend at about 75° C. for about 45 minutes. The modifier does not precipitate from the composition on cooling to room temperature. A coating of this composition on glass cured 20 minutes at 150° C. is insoluble in the parent mutual solvent. The characteristics of the cured film are comparable with those of the cured coating from composition 1d. Cured for 30 minutes at 150° C., the Example 5 coating exhibits a dissipation factor of 2.12% and a dielectric constant of 3.74 measured at 0.55 mil thickness.

*Example 6*

A coating composition is prepared by blending 2,4-diamino-6-anilino-1,3,5-triazine, also known as monophenyl melamine, with the polyamic acid solution I in the proportion of 20 parts per 100 parts of the polyamic acid content. The coating is applied to glass panels at 10 mil wet thickness and cured at 150° C. for the respective periods of 15 and 30 minutes. The solvent resistance of the cured coating is comparable with that of the benzoguanamine-modified composition 1d. These cured Example 6 coatings exhibit a slight advantage over the cured composition 1d in reference to adhesion to the glass substrate. This Example 6 composition applied to copper panels and cured for 30 minutes at 150° C. exhibits a dissipation factor of 1.24% and a dielectric constant of 3.55 measured at 0.6 mil.

*Example 7*

Coating compositions are prepared by blending 2,4-diamino-6-tolyl-1,3,5-triazine, 2,4-diamino-6-naphthyl-1,3,5-triazine and 2,4-diamino-6-biphenyl-1,3,5-triazine, i.e. aryl analogs of benzoguanamine, respectively with the polyamic acid solution I in the proportions of 15 parts per 100 parts by weight of the polyamic acid content. Coatings of these compositions cured at 150° C. exhibit properties similar to those obtained by modification of the polyamic acid composition with benzoguanamine at the same proportion.

I claim:

1. A liquid coating composition comprising, as the essential organic film-forming components in a volatile organic mutual solvent therefor, 100 parts by weight of (A) a polyamic acid composition and 5 to 45 parts of (B) a 2,4-diamino-6-substituted-s-triazine having a non-reactive solubilizing substituent in the 6-position, said substituent being selected from the group consisting of alkyl, aryl, aralkyl, alkaryl, acyclic and cyclic radicals, said polyamic acid composition being characterized by a plurality of recurring units having the general structure:

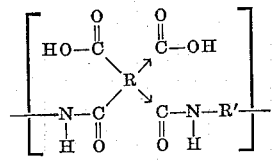

wherein the arrow → denotes isomerism, the radical

is a tetravalent organic radical containing at least two carbon atoms, no more than two carbonyl groups of each said structural unit being attached to any one carbon atom of the radical

—R'— is a divalent organic radical containing at least two carbon atoms, the amide groups of said structural polyamic acid units each being attached to separate carbon atoms of said divalent radical —R'—.

2. A polyamic acid coating composition of claim 1 wherein said radical

of said polyamic acid composition (A) originates in a tetracarboxylic acid dianhydride having the general formula:

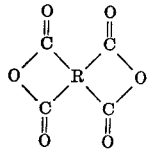

wherein the tetravalent organic radical

contains at least one ring of at least six carbon atoms, said ring being characterized by benzenoid unsaturation, each of the four carbonyl groups being attached directly to separate carbon atoms in a ring of the radical

and each pair of carbonyl groups being attached to adjacent carbon atoms in a ring of the radical

and said radical —R'— originates in a diamine having the general formula $H_2N$—R'—$NH_2$ wherein the divalent organic radical —R'— contains at least one ring of at least six carbon atoms, said ring being characterized by benzenoid unsaturation, each of the amino groups being attached directly to separate carbon atoms in a ring of the divalent radical —R'—.

3. A polyamic acid coating composition of claim 1 wherein said polyamic acid composition (A) is the reaction product of pyromellitic dianhydride and 4,4'-diaminodiphenyl ether.

4. A polyamic acid coating composition of claim 1 wherein said polyamic acid composition (A) is the reaction product of 3,4,3',4'-benzophenone tetracarboxylic dianhydride and 4,4'-diaminodiphenyl ether.

5. A polyamic acid coating composition of claim 1 wherein said polyamic acid composition (A) is the reaction product of meta-phenylenediamine and pyromellitic dianhydride.

6. A polyamic acid coating composition of claim 1 having a content of said polyamic acid composition (A) in the range of 3% to 30% by weight and a proportion of said substituted 2,4-diamino-s-triazine (B) in the range of 10 to 35 parts per 100 parts of (A).

7. A polyamic acid coating composition of claim 1 wherein (B) is 2,4-diamino-6-phenyl-1,3,5-triazine.

8. A polyamic acid coating composition of claim 1 wherein (B) is 2,4-diamino-6-cyanopropyl-1,3,5-triazine.

9. A polyamic acid coating composition of claim 1 wherein said mutual volatile organic solvent for said polyamic acid composition (A) and said s-triazine (B) comprises a normally liquid N,N-dialkylcarboxylamide.

10. A polyamic acid coating composition of claim 1 wherein the number of recurring units in said polyamic acid composition (A) are sufficient to provide said polyamic acid with an inherent viscosity in the range of 0.1 to 5 based on 0.5% concentration of said polyamic acid in N,N-dimethylacetamide.

11. A coating composition of claim 1 wherein said non-reactive solubilizing substituent in the 6-position contains an atom selected from the group consisting of an ether oxygen atom and a nitrogen atom, said nitrogen atom being in a radical selected from the group consisting of nitro, cyano and anilino radicals.

12. A coating composition of claim 1 wherein said triazine is selected from the group consisting of 2,4-diamino-6-phenyl-1,3,5-triazine, i.e. benzoguanamine
2,4-diamino-6-cyanopropyl-1,3,5-triazine,
2,4-diamino-6-cyanoethyl-1,3,5-triazine,
2,4-diamino-6-nitrophenyl-1,3,5-triazine,
2,4-diamino-6-tolyl-1,3,5-triazine,
2,4-diamino-6-anisoyl-1,3,5-triazine,
2,4-diamino-6-(N-anilino)-1,3,5-triazine,
2,4-diamino-6-naphthyl-1,3,5-triazine and
2,4-diamino-6-biphenyl-1,3,5-triazine.

References Cited

UNITED STATES PATENTS

| 2,941,904 | 6/1960 | Stalego | 117—126 |
| 2,991,196 | 7/1961 | Biefeld | 117—126 |
| 3,006,878 | 10/1961 | Talcott | 260—29.1 |
| 3,070,560 | 12/1962 | Metevia | 260—29.1 |
| 3,179,614 | 4/1965 | Edwards | 260—32.6 |
| 3,179,634 | 4/1965 | Edwards | 260—78 |

MORRIS LIEBMAN, *Primary Examiner.*

R. D. NEVIUS, *Examiner.*

H. W. MYLIUS, B. A. AMERNICK,
*Assistant Examiners.*